United States Patent
Poonsaengsathit

Patent Number: 5,925,090
Date of Patent: Jul. 20, 1999

[54] SIGN TEXT DISPLAY METHOD AND APPARATUS FOR VEHICLE NAVIGATION SYSTEM

[75] Inventor: Roderick A. Poonsaengsathit, Huntington Beach, Calif.

[73] Assignee: Alpine Electronics, Inc., Tokyo, Japan

[21] Appl. No.: 08/689,944

[22] Filed: Aug. 16, 1996

[51] Int. Cl.$^6$ ............................ G06F 165/00; G08G 1/123
[52] U.S. Cl. ........................... 701/211; 701/201; 701/209; 340/990; 340/995
[58] Field of Search ....................................... 701/201, 202, 701/205, 206, 207, 208, 209, 211, 212; 340/990, 995; 345/157

[56] References Cited

U.S. PATENT DOCUMENTS

| | | | |
|---|---|---|---|
| 5,293,163 | 3/1994 | Kakihara et al. | 701/207 |
| 5,412,573 | 5/1995 | Barnea et al. | 701/211 |
| 5,430,655 | 6/1995 | Adachi | 701/209 |
| 5,515,283 | 5/1996 | Desai et al. | 701/200 |
| 5,559,511 | 9/1996 | Ito et al. | 340/995 |
| 5,565,874 | 10/1996 | Rode | 342/457 |
| 5,587,911 | 12/1996 | Asano et al. | 701/202 |
| 5,638,279 | 6/1997 | Kishi et al. | 701/200 |
| 5,739,772 | 4/1998 | Nanbe et al. | 340/990 |

*Primary Examiner*—Tan Q. Nguyen
*Attorney, Agent, or Firm*—Brinks Hofer Gilson & Lione

[57] ABSTRACT

In a vehicle navigation system, an improvement in the way sign text data is displayed. Sign text data stored in the system corresponds to road signs and is displayed for route guidance purposes. Along certain types of road segments, for instance freeway ramps where there are multiple signs in sequence and each sign is associated with a decision point at which the driver must decide which direction to take, a comparison is made between the content (the sign text) of the first sign and the last sign in the sequence. If any words or phrases coincide, only the content of the last sign is displayed at the point of the first sign. This simplifies the displayed sign text and provides better and more concise route guidance to the driver.

35 Claims, 7 Drawing Sheets

SIGN TEXT DISPLAY METHOD AND APPARATUS FOR VEHICLE NAVIGATION SYSTEM

BACKGROUND OF THE INVENTION

1. Field of the Invention

This invention relates to navigation systems and more particularly to a vehicle navigation system and method for displaying, to a user, road sign information for route guidance.

2. Description of the Prior art

Vehicle navigation systems are well known; see e.g. Yamada et al., U.S. Pat. No. 4,926,336; Link et al., U.S. Pat. No. 5,270,937; and Ichikawa, U.S. Pat. No. 5,410,485. Such navigation systems typically include two major functions. One function is route guidance which determines the optimum route to be followed from a starting point to a destination, typically along a network of roads. The other function is displaying to the user of the system (typically the driver of the vehicle), both the current location and the route to be followed. This is usually in the form of a map displayed on a small display screen installed in the vehicle. Such systems are well known and not described herein in further detail.

As is well known, typically in such systems a database is provided of the road network. This database is all of the roads for instance in one state or in some other fairly large geographical area. This representation of the road network is sometimes referred to as a digitized map database. It includes for each road the road name, and divides each road into one or more road segments, where a road segment extends from one road node to another. A road node is typically either an intersection with another road or an intersection of a road with some arbitrary boundary, e.g. a state boundary and has an associated latitude and longitude.

In addition to providing the actual road information for use by the system, a typical digitized map database also includes road sign information. That is, when the database is compiled, i.e., by a survey of the roads, the surveyor also enters into the database the textual contents of at least some of the actual road signs encountered along each road segment. This actual road sign information is used in the prior art for route guidance, especially on roads such as freeways or equivalents (multi-lane limited access roads). When the system is providing route guidance such as from a freeway exiting onto a surface street, road sign information, referred to as "sign text" is displayed on the display screen to the user. This sign text allows the driver to recognize the actual road sign information at a bifurcation in the road, i.e. a node, and more easily decide which road to follow. Thus this display of sign text enhances the route guidance function.

An example of this is shown in FIG. 1 where the guided route indicated by the dotted line is from the current vehicle location on freeway C to the Harbor Freeway 110 South. This route, involving a connection from one freeway to another, requires driving along the ramp connecting the two freeways. In the context of this application a "ramp" connects roads that do not intersect at grade. When a ramp intersects with another road, the ramp ends. Hence a ramp is e.g. a route entering a freeway (or equivalent) from a surface street; a route exiting from a freeway (or equivalent) onto an ordinary street; a route connecting one freeway (or equivalent) with another freeway (or equivalent); and also a route connecting two non-freeways (or equivalents), for instance a ramp connecting the upper and lower roadways at an airport. A ramp, like any other route, includes at least one road segment. These ramp road segments connect at decision (node) points. For instance as shown in FIG. 1, the ramp segment 1 begins at the first decision point DPT1 and ends at a second decision point DPT2. A decision point is a node at which the navigation system determines (or the database indicates) that route guidance is required. The sign text associated with the first decision point, i.e., the sign text stored in the database associated with the first decision point DPT1, may contain information relating successive decision points along the guided route. If a decision point lies between two road segments (e.g. road segment 1 and road segment 2), and the vehicle is traveling from segment 1 to segment 2, the sign text associated with that decision point is attached in the database to road segment 2.

As shown in FIG. 1, the sign text data stored in the database and associated with the first decision point DPT1 is 110 Harbor Freeway/San Pedro/Los Angeles. The sign text data stored in the database and associated with the second decision point DPT2 is 110 South Harbor Freeway/San Pedro. FIG. 1 also shows the text of the actual physical road signs of each of these decision points.

Hence the sign text data is an edited version of the actual text of the road sign and is often not the identical words nor arranged identically. Typically the sign text data is somewhat edited to make it meaningful for use in the database. This editing is a part of the compilation of the database. It is to be understood that typically the database is produced and sold separately from the actual navigation system since such a navigation system must be useful anywhere e.g. in the United States, and typically a user would not purchase a database covering the entire United States but would only purchase a database for a part of the United States. Hence the databases are usually sold in the form of e.g. a CD-ROM containing the database needed by a particular user for a particular geographical area.

In the prior art at the guidance point GPT1, which is prior to the associated decision point DPT1, the system displays on its screen the sign text 110 Harbor Freeway/San Pedro/Los Angeles. Later on at guidance point GPT2 along the guided route, guidance point GPT2 being somewhat before the associated decision point DPT2, the system displays the sign text 110 South Harbor Freeway/San Pedro. It can be seen that the guidance points do not correspond to any actual physical entity on the road network, but instead are only a part of the database. A guidance point is a point at which an instruction is given at a certain distance before the associated decision point. The distance depends on the type of road segment on which the vehicle is currently traveling. Of course, it is necessary for the guidance to be given prior to the driver reaching the actual decision point, since otherwise the guidance would be of little or no use. The distance between the decision point and the associated guidance point is somewhat arbitrary but is typically set such that the driver has sufficient time to look at the display and react, and hence represents a travel distance at a typical driving speed along the particular road segment in question of e.g. 30 seconds.

Thus at the first guidance point GPT1 the sign text is essentially the same as the text of the actual road sign. At the second guidance point GPT2 the sign text data corresponds to a portion of the actual text of the road sign at the second decision point DPT2.

While of some use, this method has the disadvantage that the particular sign text associated with a decision point may contain too much information to fit on a limited size display, and also may confuse and distract the user. It is to be understood that the display typically is either a very small CRT or a small liquid crystal display, measuring only a few inches wide. In addition to displaying the sign text, typically the display at the same time displays a representation of a map of the roads at the current vehicle position and along the guided route.

Hence while the prior art display method is accurate in the sense that it depicts either actual road signs or gives guidance, the guidance may be confusing and hence of limited value. Since of course the driver can only give very limited attention to the navigation system display in order to drive safely, even a relatively minor distraction or a partially confusing representation of information is considered to be very undesirable in such systems.

SUMMARY

In accordance with this invention, the display of the sign text information for route guidance is simplified compared to that of the above-described prior art. Thus in accordance with the invention the last sign text, i.e. that associated with the last decision point on a particular portion of a guided route, is the sign text displayed at a current decision point along the guided route. This eliminates most of the unnecessary (non-coinciding) information included in the first sign text as stored in the database, and so makes it easier for the driver to prepare for the next decision point by getting into the appropriate road lane. Typically the guided route in question is one along a ramp as defined above. Hence if there is no match found at the first decision point, this process is then carried out for subsequent decision points along the guided route, i.e., if there were three decision points and no match is found at the first decision point, the same process is undertaken at the second decision point to determine if there are coinciding portions of the sign text at the second decision point and the last decision point along the ramp. It is to be understood that in the case where the guided route is straight at an intersection that does not involve a ramp road segment, and hence no maneuver guidance is necessary at that intersection, the intersection is not a decision point as defined herein.

Thus in accordance with the invention after the guided route has been selected, i.e., the current vehicle position is determined by the system sensors and the driver has indicated his destination, the system automatically constructs a road segment list of the guided route selecting an optimum route in terms of a parameter such as minimum travel time, minimum travel distance, or maximum use of high speed road segments. The system then determines if the next road segment is a ramp road segment. The "ramp" road segment (s), as described further below, in one embodiment are defined somewhat arbitrarily to be any road segment.

The system reads out from the database the sign text data for, in this context, the current guidance point and last guidance point along the ramp. The current guidance point is the next guidance point to be encountered, because as described in further detail below, this process under certain circumstances is undertaken not only for the first guidance point along the ramp, but at each subsequent guidance point until the next to last guidance point along the ramp.

Then the phrases and words contained in the last sign text are compared to those of the current sign text. If there are any coinciding words and/or phrases, only the last sign text is displayed at the current decision point.

If there are no coinciding words and phrases at the current decision point, the comparison process is then undertaken at each subsequent guidance point along the ramp, and only if there are coinciding words and phrases, is the last sign text displayed at the subsequent guidance point. Of course, once a match (coincidence) is found, the last sign text data is displayed up to the last guidance point.

To describe this slightly differently, along certain types of linked road segments connected at decision points (nodes), there are multiple road signs in sequence, each road sign being associated with a decision point at which the driver must decide which direction to take. A comparison is made by the navigation system between the contents of the next (current) road sign to be encountered and the last road sign in the sequence, using the database sign text data. If any words or phrases of the compared sign texts coincide, at the point of the next road sign the last sign text is displayed, until one passes the last decision point.

Whereas this description is in the context of a visual display of sign text data, for an audible announcement of sign text the process is identical except that the output is audible and of course this permits operation without having the driver look at his display, thus enhancing usability. Of course, many present navigation systems do not have an audible announcement capability for sign text data and so cannot make such an announcement.

DETAILED DESCRIPTION

Figure 2:
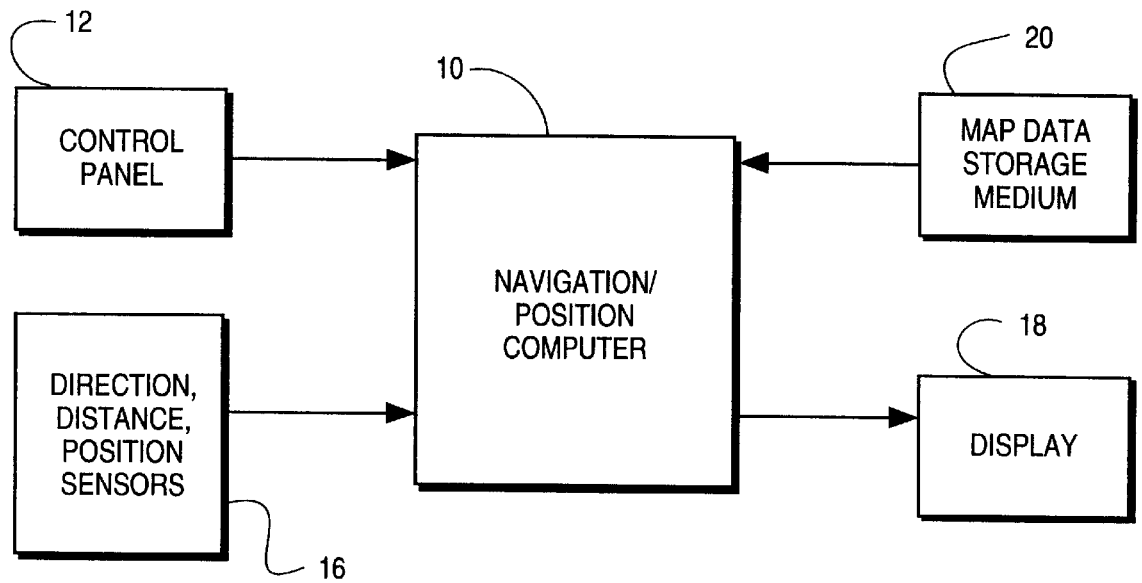
FIG. 2 shows a conventional vehicle navigation system and also one in accordance with this invention.

A navigation system in accordance with this invention is in most respects similar to that of the various types of well known prior art navigation systems and includes as shown in FIG. 2 a central processing unit (computer) 10 such as a microprocessor or microcontroller, a control panel (user interface) 12 such as a keypad, a display 18, an audible communication device such as a loud speaker (not shown), and associated non-volatile memory 20 which is a map data storage medium for holding the road database (i.e., a map storage medium). Typically this memory is in the form of a CD-ROM or hard disk drive. Of course the non-volatile memory holding the road database could be in other forms such as semiconductor (electronic) Read Only Memory (ROM). Also included is a set of distance, direction and position sensors 16 such as a GPS system, a gyroscope, and the vehicle odometer/speedometer.

In general both the route finding and the associated map display method and apparatus in accordance with this invention are of the type used in the prior art and hence are not disclosed herein in any further detail, except as set forth hereinafter.

Figure 1:
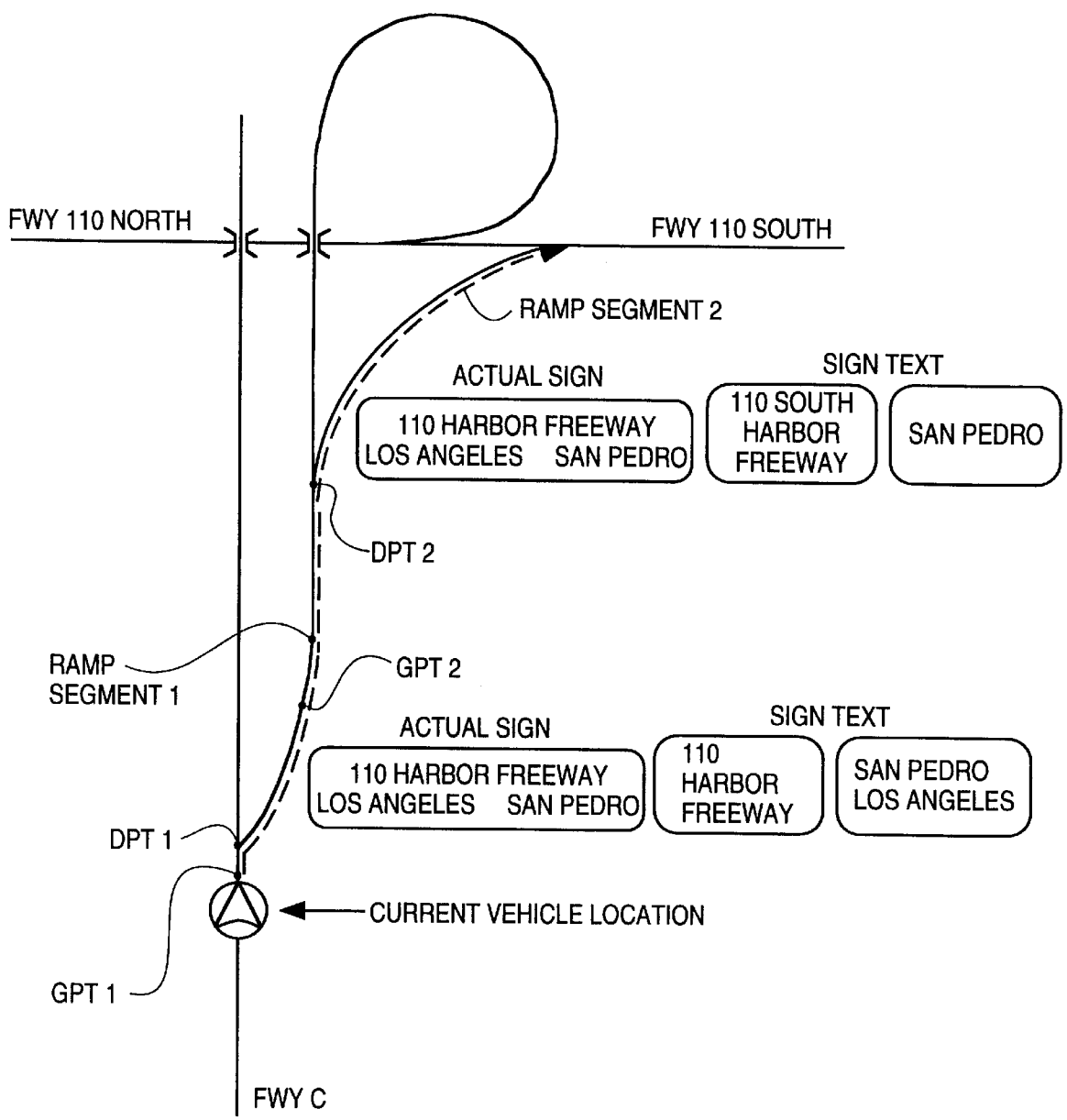
FIG. 1 shows the technical problem addressed by the present invention.

Referring again to FIG. 1, this shows the optimum guided route along the dotted line from the current vehicle position on freeway C to the Harbor Freeway 110 headed in the southerly direction ("South"). The actual physical road sign at decision point DPT1 is as shown. In general the entire text of a road sign is not stored in the database as sign text; instead when the database is prepared the surveyor edits the actual road sign text to eliminate non-destination related words such as for instance right, left, exit, lane, etc. Also when the sign text data is entered into the database, delimiters are provided. In this example the phrase delimiter in the database is a slash mark; this of course is merely illustrative of a phrase delimiter. Thus for instance the sign text data associated with ramp segment 1 as shown is also read out from the database. The sign text data associated with the last ramp segment (i.e., the last guidance point GPT2) is also read out. A group of words of the sign text data separated by a slash is defined as a phrase and any part separated by a space in a phrase is defined as a word. This definition is not limiting, however. It is to be understood that the present invention in one embodiment is intended to operate with a database of the commercially available type and these delimiters are of the type conventionally used.

Also it is to be understood that the term "ramp" as used herein in one embodiment refers to any road segment which is designated as a ramp in the database. Typically this is done by providing a ramp identification field (bit) in each road segment entry in the database. It can be seen therefore that the present method is not limited to a ramp as defined above but may be applied to any particular type of designated road segment.

Therefore in this particular example, the first sign text data includes three phrases: 110 Harbor Freeway, San Pedro, and Los Angeles. The first phrase includes three words: 110, Harbor, and Freeway. The phrase San Pedro includes two words: San and Pedro. The phrase Los Angeles also of course includes two words: Los and Angeles. In the same way the last sign text data along this ramp includes two phrases: 110 South Harbor Freeway and San Pedro. The first phrase includes four words: 110, South, Harbor, and Freeway. The phrase San Pedro includes two words: San and Pedro.

Figure 3:
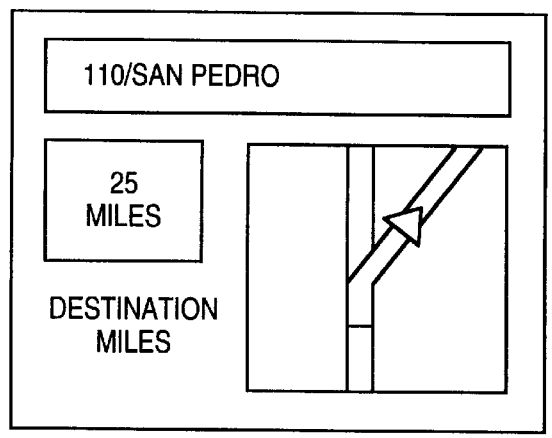
FIG. 3 shows a display of navigation sign text in accordance with this invention.

The navigation system then makes a comparison to determine if any phrase or any word(s) of the last sign text data coincides with that of the current (here also the first) sign text data. If there are any coinciding words or phrases, the last sign text data is displayed. In this case the word 110 and the phrase San Pedro are both included in the first sign text data and in the last sign text data, hence there is a match. Therefore, the system displays at the first guidance point which is GPT1 the last sign text data, 110 South/San Pedro. (Freeway names are not displayed in one embodiment, for simplicity.) This actual display is shown in FIG. 3. The sign text data is located here at the top of the display and the remainder of the display is conventional indicating the mileage to the next decision point and the mileage to the destination (blank here) and showing that one should make a turn at DPT1 onto the ramp, as indicated by the arrow.

Figure 4:
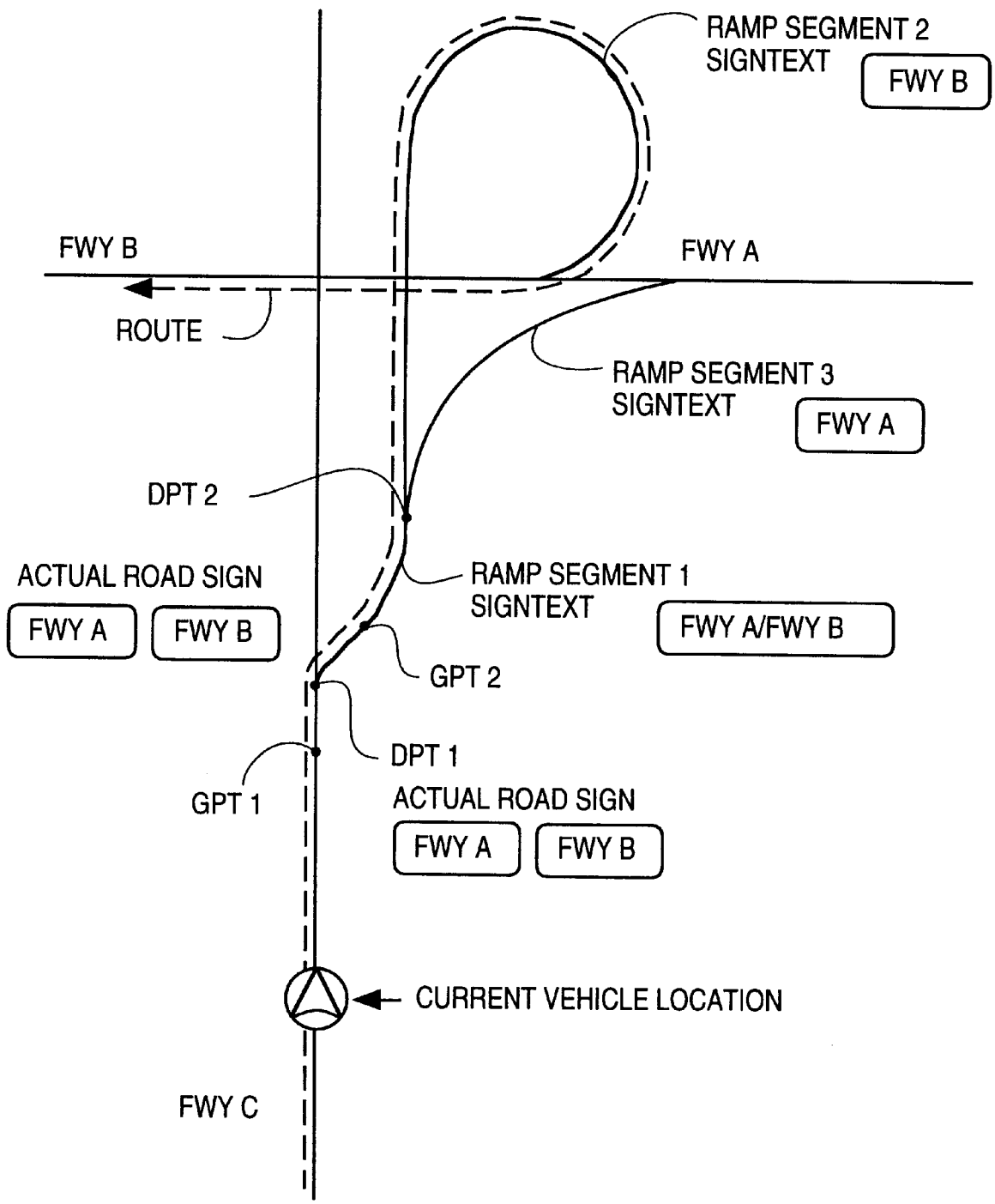
FIG. 4 shows an example of the present method.

FIG. 4 shows another example in accordance with this invention. Here the actual road layout is identical to that of FIG. 1 although the names of the roads are different and the guided route, as shown, is different. In this case the guided route is from the current vehicle location on freeway C along ramp segment 1 to ramp segment 2 and entering freeway B. In this example freeway B has a different designation than freeway A. (In this example, freeway B corresponds to freeway 110 North in FIG. 1 and freeway A corresponds to freeway 110 South in FIG. 1.) As shown, the sign text data associated with ramp segment 1 in the database is FWY A/FWY B. The sign text data associated with ramp segment 2 is FWY B. The sign text data associated with ramp segment 3 is FWY A. The system compares the phrases and words of the last sign text data on the guided route to freeway B with the phrases and words of the first sign text data at DPT1. Thus the comparison is FWY A/FWY B with FWY B. The coinciding phrase FWY B is found, hence at the first guidance point GPT1 the displayed sign text is FWY B which is the last sign text data. In this case the resulting simplification is clear; that is, at guidance point GPT1 the display omits any reference to freeway A, hence simplifying the display for the user.

Figure 5:
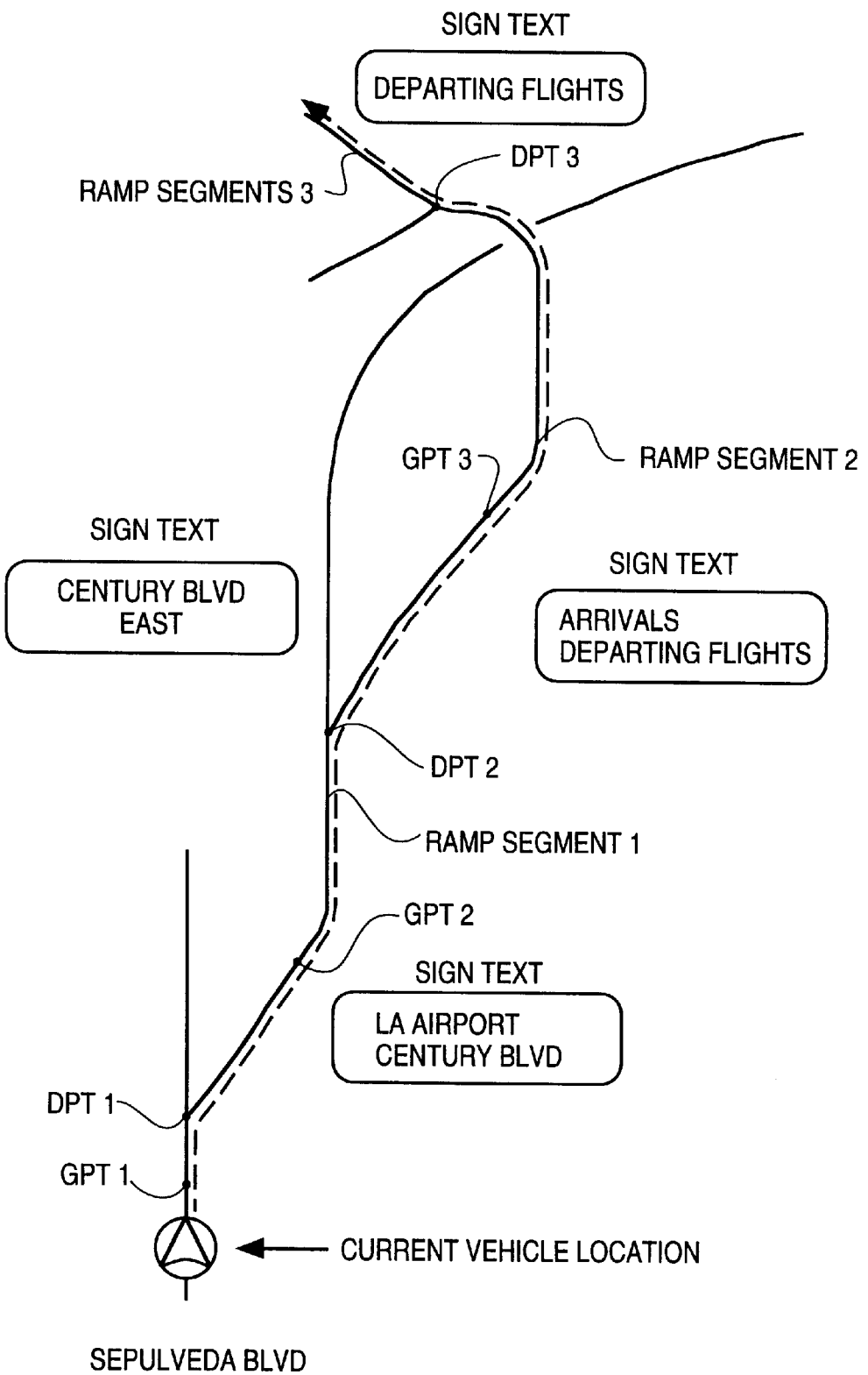
FIG. 5 shows yet another example of the present method.

Yet another example is shown in FIG. 5. Here the guided route, again shown by the dotted line, is from the current vehicle position on Sepulveda Boulevard along ramp segment 1 to ramp segments 2 and 3. The sign text data associated with ramp segment 1 is L.A. Airport/Century Blvd. Comparing this to the phrases and words of the last sign text data (Departing Flights) along this ramp, there is no coinciding portion. Therefore at the first guidance point GPT1, the associated first sign text data is displayed. In this example, the present method reverts to that used in the prior art.

FIG. 5 also therefore illustrates another example where there is no coinciding word and phrase of the first sign text with the last sign text, but there is a coincidence between a subsequent sign text and the last sign text. Again in FIG. 5 the guided route is from the current vehicle location to ramp segment 3 via ramp segments 1 and 2. The sign text data associated with ramp segment 2 is Arrivals/Departing Flights. The sign text data associated with ramp segment 3 is Departing Flights. Hence at GPT2, the comparison is made between the sign texts Arrivals/Departing Flights and Departing Flights. The coinciding sign text phrase Departing Flights is found and the last sign text Departing Flights is displayed at GPT2.

Figure 6A:
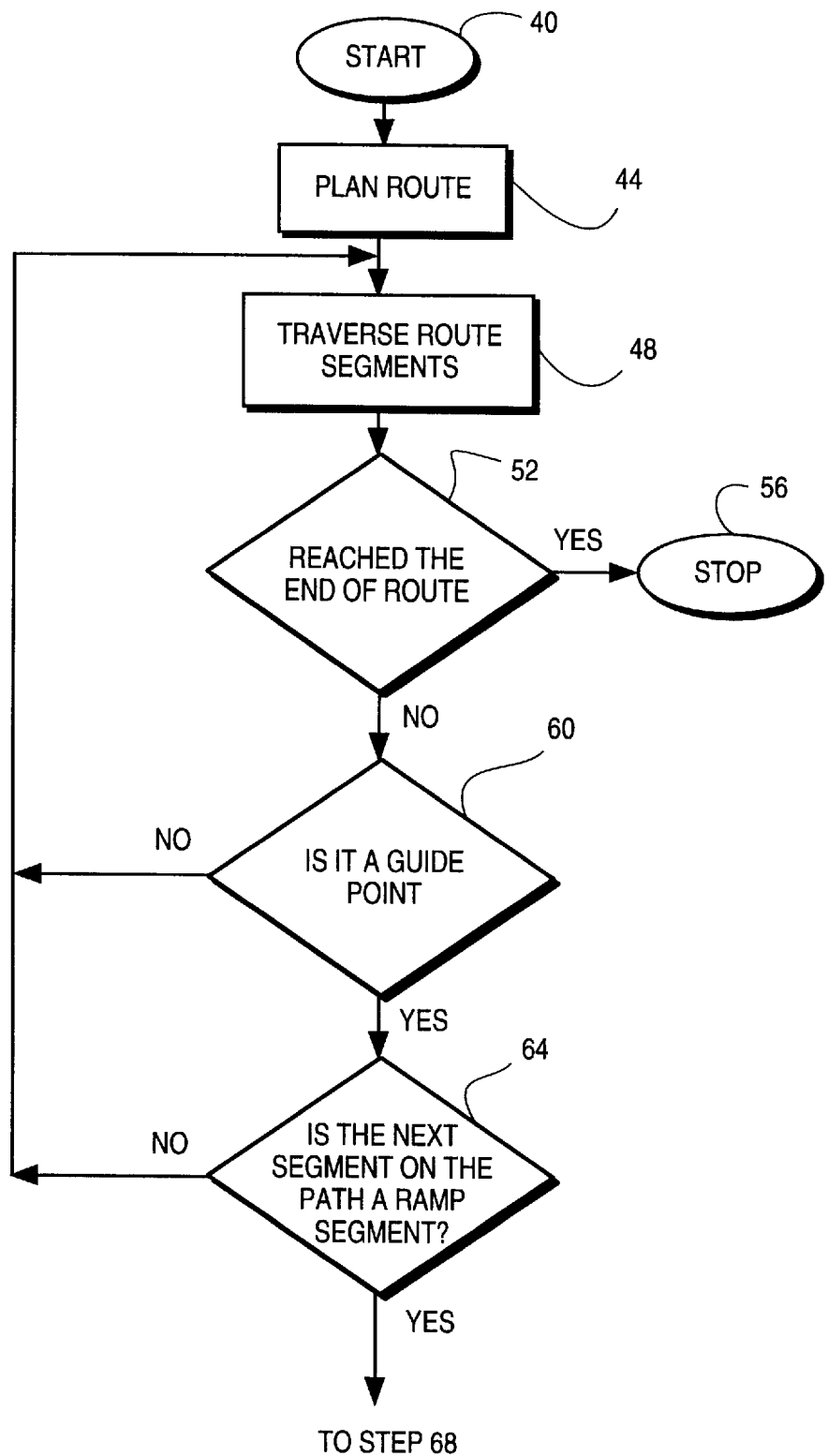
FIGS. 6A, 6B show a flow chart of a computer program in accordance with the present method and an associated apparatus.
Figure 6B:
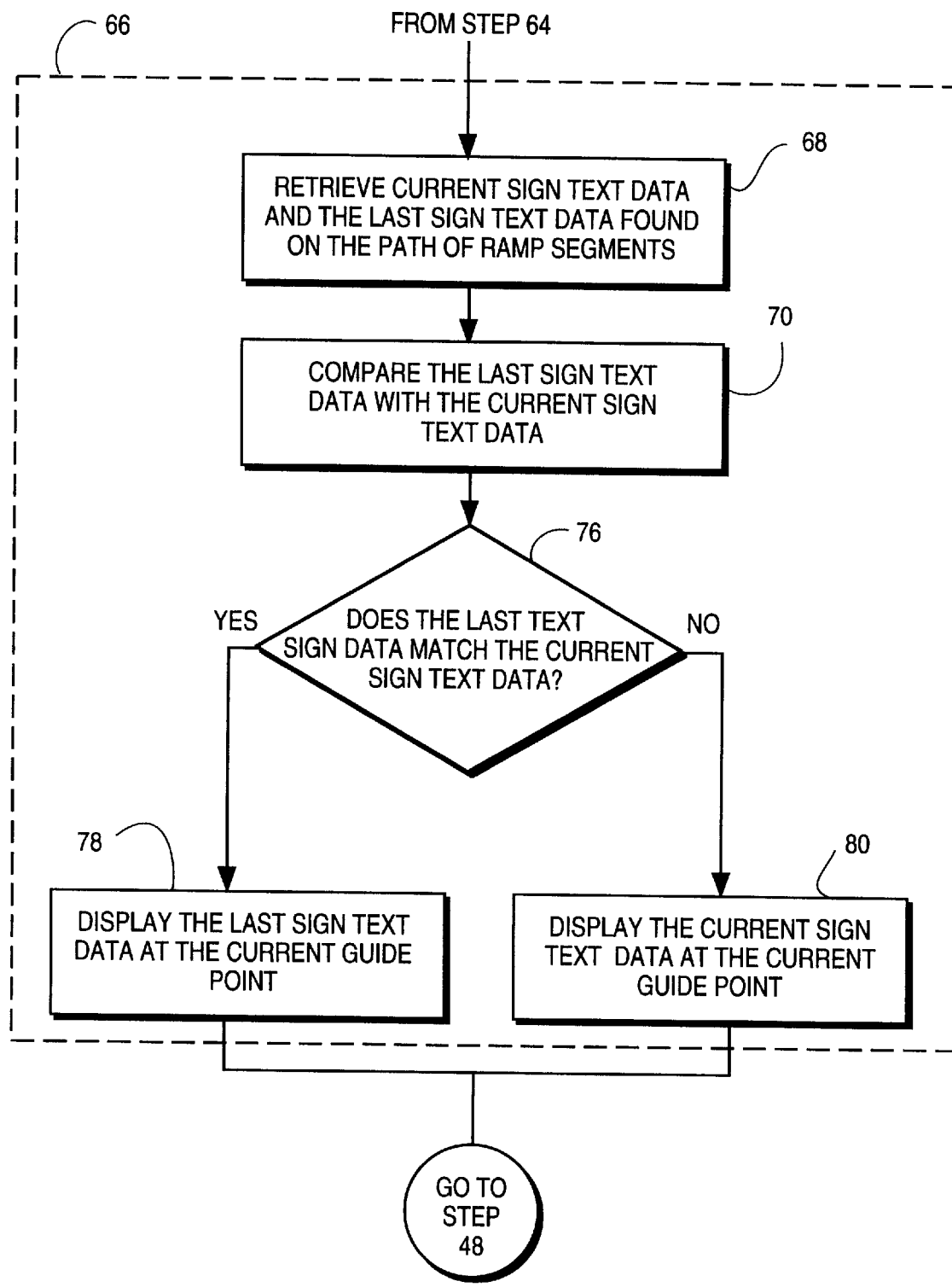

A flow chart of a computer program in accordance with this invention is shown in FIGS. 6A, 6B. It is to be understood that typically such navigation systems operate by the central processing unit 10 of FIG. 2 executing a computer program (computer code) which is stored in a non-volatile computer readable memory associated with the central processing unit 10. This code (set of executable computer instructions) may be in any of a number of well known computer languages. Moreover, the computer program, which is extensive, controls the entire operation of the navigation system; the flow chart shown in FIGS. 6A, 6B only describes in any detail the portion of the program directed to the improvement as described herein for display of sign text. Coding this portion of the computer program would be well within the skill of one of ordinary skill in the art in light of this disclosure.

FIG. 6A begins with the start step 40. It is to be understood that the navigation system at this point is in normal operation, and moreover this program is intended for use with a database which is a road segment based database, compared to a node based database. However, with suitable adaptations the present method and apparatus would be suitable with a node based database. Such modifications would be readily apparent to one of ordinary skill in the art.

In step 44, the system, in conjunction with user input, plans a guided route from the current vehicle location to a destination. This selection of a guided route is conventional, and while the conventional methods are relatively complex, are not described in any further detail herein. Next at step 48 the system has selected the guided route as a conventional road segment list listing the road segments along the guided route, and the vehicle under control of the driver begins traversing these route road segments.

As the vehicle traverses the route, at the end of each road segment the system determines if the end of the route has been reached, in step 52. If yes, the execution stops at step 56. If no, then in step 60 the determination is made if there is a guide point associated with the current road segment, in step 60. If no in step 60, control returns to step 48; if yes, then in step 64, the determination is made if the next road segment on the route is a ramp segment. (A ramp segment, as described above, is e.g. any road segment so designated in the database.)

If the next segment is not a ramp segment, the present method is not applicable and hence the answer to the question in step 64 is No and control returns to step 48. If however the next segment on the guided route is a ramp segment, then at step 68 the sign text data associated with the current guide point and the sign text data associated with the last guide point on the guided route are retrieved from the database. (Steps 68 to 80, inside the dotted line 66, represent the present method in accordance with the invention.)

In step 70 the system compares the current sign text data to the last sign text data. At step 76 the determination is made if there are any coinciding words or phrases as a result of the comparison of step 70. If the answer at step 76 is No, i.e., there are no coinciding words and no coinciding phrases, then execution transfers to step 80 and the current sign text data for the current guide point is displayed. The actual method of operation and the apparatus of this display are conventional. Moreover, in this context "display" may include an audible announcement of the sign text data, or may be the audible announcement without the visual display if the system has the capability to audibly announce alphanumeric sign text data.

A more interesting case, of course, is if the answer in step 76 is Yes, in which case in step 78 the system displays the last sign text data at the current guide point. After execution of either step 78 or 80, control returns to step 48.

Note that in one embodiment the displayed sign text data is selectably edited by the system prior to the actual display step to delete or edit unnecessary words, such as freeway names; directions "North", "South", are edited to "S", "N", etc.

Hence the present method is carried out under certain circumstances multiple times along a particular ramp and the display is updated as one passes particular guidance points. Thus even if the first guidance point sign text contains no words and phrases coinciding with that of the last guidance point, the second or subsequent guidance points may do so, in which case the present method is useful in providing guidance at least at the second or subsequent guidance points.

Detail of an example of the actual comparison and determination of steps 70 and 76 is described hereinafter for one embodiment. However, this particular comparison method is not limiting and there are other ways to perform the comparison.

For the example (see FIG. 1), the first sign text (designated ST1) is:

110/Harbor Freeway/San Pedro/Los Angeles.

The last sign text (designated ST2) (associated with the last guidance point on the ramp) is:

110 South/Harbor Freeway/San Pedro As described above, each sign text is one or more phrases delimited e.g. by slashes.

The selected last sign text then is:

110 South/Harbor Freeway/San Pedro and the actual displayed sign text (after editing) is:

110/San Pedro because in this embodiment references to freeway names and other words e.g. "South,"are not displayed for simplicity.

Figure 7:
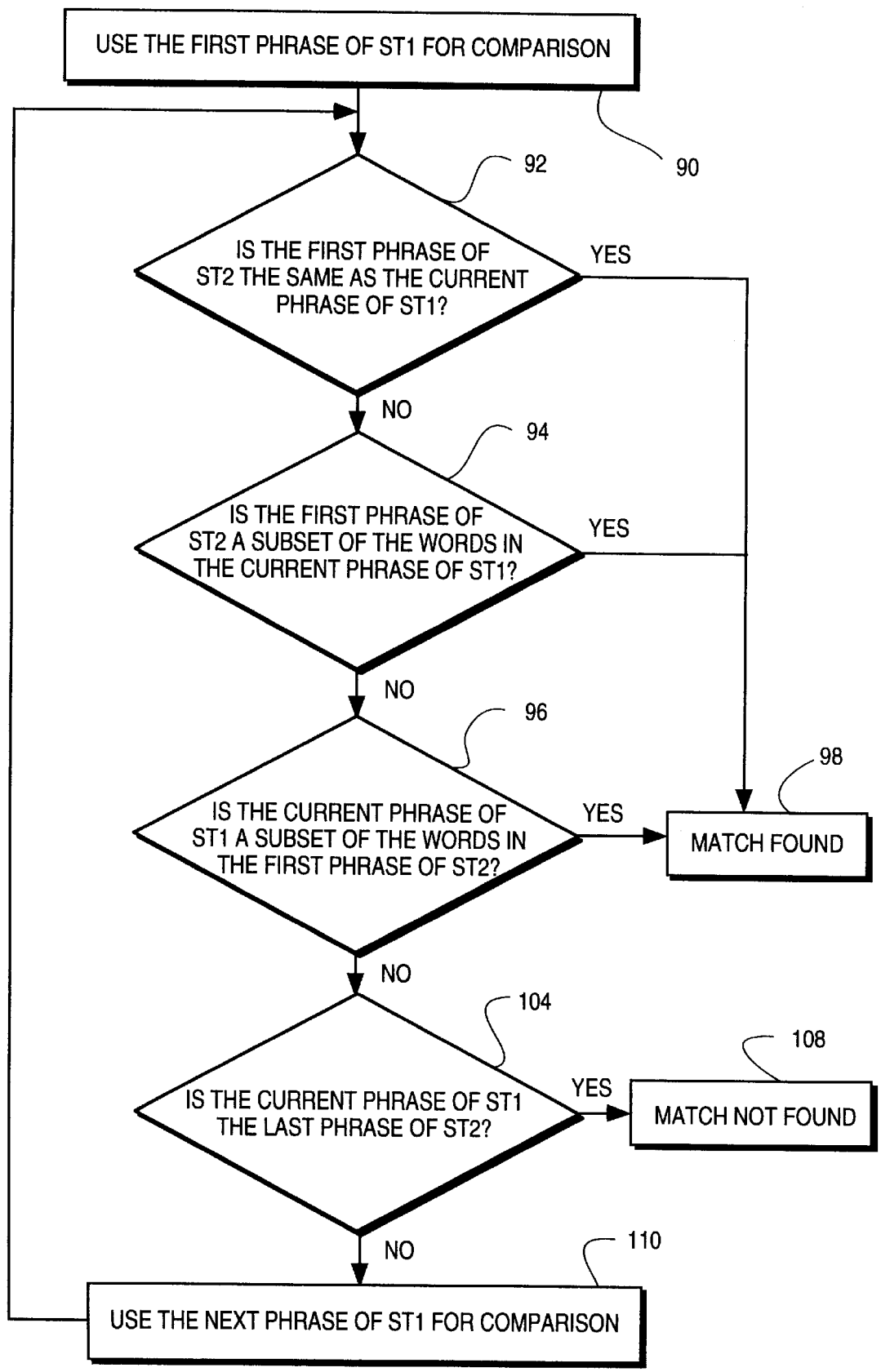
FIG. 7 shows a flow chart showing detail of the sign text comparison of FIG. 6B.

This process is illustrated in the flow chart of FIG. 7, referring to two sign texts ST1 and ST2. In step 90, the first phrase of ST1 is the current phrase used for comparison. In step 92, the determination is made if the first phrase of ST2 is the same as the current phrase of ST2. If yes, there is a match, and control transfers to step 98. If no, proceed to step 94, where the determination is made if the phrase of ST2 is a subset of the words in the current phrase of ST1. If yes, there is a match and control transfers to step 98.

If no in step 94, proceed to step 96 to determine if the current phrase of ST1 is a subset of the words in the first phrase of ST2. If yes, there is a match and control transfers to step 98.

If no in step 98, the determination is made in step 104 if the current phrase of ST1 is the last phrase of ST1. If yes, there is no match and the comparison ends at step 108. If no in step 104, return to step 92 for the next phrase of ST1.

If a match is found and control transfers to step 98, the last sign text of ST2 is displayed, in step 78 of FIG. 6B.

This description is illustrative and not limiting. Further modifications will be apparent to one skilled in the art in the light of this disclosure and are intended to fall within the scope of the appended claims.

I claim:

1. In a navigation system, a method of indicating to a user a route on a road network, the road network including a plurality of road segments connecting at intersections, the method comprising the steps of:

assigning a decision point to each of selected intersections;

storing guiding data associated with each decision point, the guiding data indicating a guided route at the associated decision point;

for a guided route including a plurality of road segments, retrieving the guiding data associated with all decision points along the guided route;

comparing the guiding data associated with a current decision point along the guided route to the guiding data associated with a last decision point along the guided route; and if at least a portion of the compared guiding data coincides, providing to the user only the guiding data associated with the last decision point.

2. The method of claim 1, wherein the step of providing includes visually displaying the guiding data.

3. The guidance method of claim 1, wherein the step of providing includes audibly announcing the guiding data.

4. The method of claim 1, wherein the coinciding portion of the guiding data is a phrase.

5. The method of claim 1, wherein the coinciding portion of the guiding data is at least a word.

6. The method of claim 1, wherein the guiding data is a sign text.

7. The method of claim 1, wherein the guiding date is identical to a text of a road sign near the decision point.

8. The method of claim 1, wherein the guiding data is an edited version of a text of a road sign near the decision point.

9. The method of claim 1, wherein the guided route is at least in part along a ramp.

10. The method of claim 9, wherein the ramp connects a limited access highway to a street.

11. The method of claim 9, wherein the ramp connects two streets.

12. The method of claim 1, wherein the step of providing occurs prior to the current decision point.

13. The method of claim 1, wherein the step of providing occurs near a decision point intermediate of a first and the last decision points.

14. The method of claim 1, wherein a coinciding portion of the guiding data is one of at least a word and a phrase, and further comprising the steps of:

first determining if the coinciding portion of the data is a phrase; and second determining if the coinciding portion is not a phrase and is at least a word.

15. The method of claim 1, wherein the ramp connects two limited access highways.

16. The method of claim 1, further comprising determining if the route includes a ramp, and performing the step of retrieving only if the route includes a ramp.

17. The method of claim 1, further comprising the step of deleting a selected portion of the guiding data associated with the last decision point, prior to the step of providing.

18. A navigation system for indicating to a user a route on a road network, the road network including a plurality of road segments connecting at intersections, the system comprising:

means for assigning a decision point to each of selected intersections;

a memory storing guiding data associated with each decision point, the guiding data indicating a guided route at the associated decision point;

means for retrieving from the memory the guiding data associated with all decision points along the guided route, for a guided route including a plurality of road segments;

means for comparing the guiding data associated with a current decision point along the guided route to guiding data associated with a last decision point along the guided route; and means for providing to the user only the guiding data associated with the last decision point if at least a portion of the compared guiding data coincides.

19. The system of claim 18, wherein the means for providing includes a visual display.

20. The system of claim 18 wherein the means for providing includes means for audibly announcing.

21. The system of claim 18 wherein the coinciding portion of the data is a phrase.

22. The system of claim 18, wherein the coinciding portion of the data is at least a word.

23. The system of claim 18, wherein the guiding data is a sign text.

24. The system of claim 18, wherein the guiding data is identical to a text of a road sign near the decision point.

25. The system of claim 18, wherein the guiding data is an edited version of a text of a road sign near the decision point.

26. The system of claim 18, wherein the guided route is at least in part along a highway ramp.

27. The system of claim 26, wherein the ramp connects a limited access highway to a street.

28. The system of claim 26, wherein the ramp connects two limited access highways.

29. The system of claim 26, wherein the ramp connects two streets.

30. The system of claim 18, wherein the means for providing operates prior to the current decision point.

31. The system of claim 18, wherein the means for providing operates near a decision point intermediate of a first and last decision points.

32. The system of claim 18, further comprising means for determining if the route includes a ramp, and means for performing the step of retrieving only if the route includes a ramp.

33. The system of claim 18, further comprising means for deleting a selected portion of the guiding data associated with the last decision point before it is provided to the user.

34. A computer-readable memory containing program instructions for indicating to a user of a navigation system a route on a road network, the road network including a plurality of road segments connecting at intersections, the instructions comprising:

assigning a decision point to each of selected intersections;

storing guiding data associated with each decision point, the guiding data indicating a guided route at the associated decision point;

for a guided route including a plurality of road segments, retrieving the guiding data associated with all decision points along the guided route;

comparing the guiding data associated with a current decision point along the guided route to the guiding data associated with a last decision point along the guided route; and if at least a portion of the compared guiding data coincides, providing to the user only the guiding data associated with the last decision point.

35. A computer-implemented navigation system for indicating to a user a route on a road network, the road network including a plurality of road segments connecting at intersections, the system comprising:

means for assigning a decision point to each of selected intersections;

a memory storing guiding data associated with each decision point, the guiding data indicating a guided route at the associated decision point;

means for retrieving from the memory the guiding data associated with all decision points along the guided route, for a guided route including a plurality of road segments;

means for comparing the guiding data associated with a current decision point along the guided route to guiding data associated with a last decision point along the guided route; and means for providing to the user only the guiding data associated with the last decision point if at least a portion of the compared guiding data coincides.

\* \* \* \* \*